(No Model.)
E. H. JOHNSON.
DEVICE FOR TRANSMITTING POWER FROM ELECTRIC MOTORS.
No. 335,285. Patented Feb. 2, 1886.
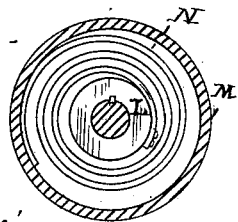
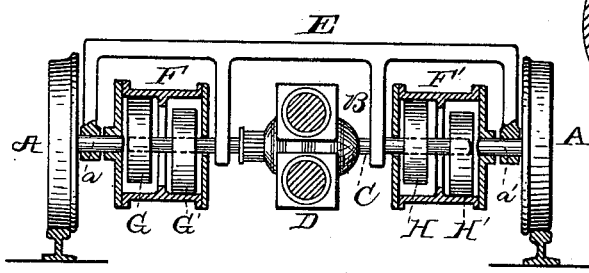
Fig. 1. Fig. 3.
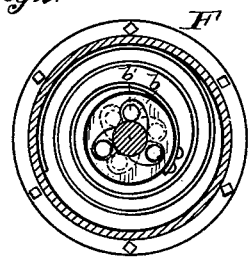
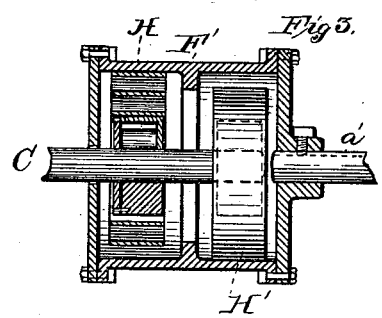
Fig. 2. Fig. 5.
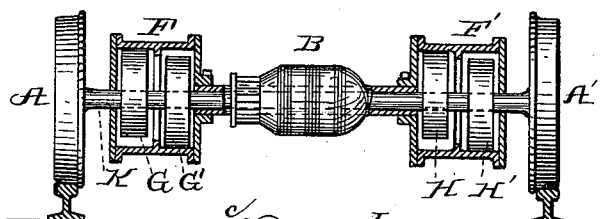
Fig. 4.
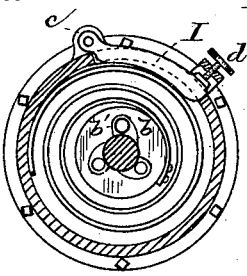
Fig. 5.
ATTEST:
E. H. Rowland
H. W. Tiddle
INVENTOR:
Edward H. Johnson,
By Dyer & Seely
Attys.

UNITED STATES PATENT OFFICE.

EDWARD H. JOHNSON, OF NEW YORK, N. Y.

DEVICE FOR TRANSMITTING POWER FROM ELECTRIC MOTORS.

SPECIFICATION forming part of Letters Patent No. 335,285, dated February 2, 1886.

Application filed April 7, 1885. Serial No. 161,443. (No model.)

*To all whom it may concern:*

Be it known that I, EDWARD H. JOHNSON, of New York city, in the county and State of New York, have invented a certain new and useful Improvement in Devices for Transmitting Power from Electric Motors, of which the following is a specification.

Heretofore in electric railways an important problem for solution has been the providing of means for starting the trains from a position of rest without the necessity of unduly enlarging the electric motors beyond the power required for running the trains while in motion.

The object I have in view is to provide simple and efficient devices for accomplishing this end.

A further object is to apply the power of the motor gradually to the driving-wheels, so that the motor may be given its full power at once, and also to provide an automatically-acting releasing device preventing the stopping of the motor and the consequent burning out of the armature or the breaking of the circuit at a safety-catch when the load exceeds the power of the motor, while the maximum power of the motor is continuously applied to the driven apparatus.

The invention is also applicable to electric motors generally, whether stationary or mounted upon moving vehicles, the features of the gradual application of the power of the motor to the work and the releasing safety device being of great utility wherever electric motors are used.

In carrying out my invention as applied to locomotives for electric railways I connect the motor to the driving-wheels by an intermediate spring mechanism, which takes up the difference in motion between the motor and the driving-wheels, and in which the power of the motor is stored up. This is arranged to permit the reverse movement of the motor by the use of a double set of reversely-arranged springs and suitable devices for bringing one set into action for one movement and the other set for the reverse movement. The springs, which are broad plate-springs arranged as geometrical spirals, are inclosed in drums, and are free at their outer ends, which bear frictionally upon the inner surface of the drums. The parts are constructed so that the springs bear with sufficient friction on the drums to hold until the springs are wound up to the point where the maximum power of the motor is nearly reached, when the friction is overcome and the springs turn within the drums, the maximum power of the motor being, however, continuously exerted upon the driven machine. If the friction-surfaces are uneven, as they may be, the movement of the springs within the drums will not be uniform and continuous, but will be by impulses, the movement being retarded or momentarily stopped at points of greatest friction until the spring regains the tension which it loses in passing over portions of the surface having less friction. The increased power and momentum of the motor will be expended upon the driving-wheels at each retardation or stoppage, and the motor will be enabled to start a heavier train than it otherwise could. To make this action, which, as stated, is a desirable one, certain, and to provide means for adjustment to set the mechanism accurately for releasing under a definite strain and to take up wear, I provide the bearing-surface upon which each spring rides with one or more portions which project slightly beyond the rest of the bearing-surface and are adjustable. I prefer to use a shoe projecting into the drums in the path of the bearing end of each spring. This shoe may be pivoted at one end and be held adjustably by a screw or other device at the other end. It preferably is flush with the friction-surface of the drum, at its pivoted end, and has its greatest projection beyond such surface at or near its other end, the projection being gradually formed.

I prefer to mount my motor-armature upon the same axis as the drivers, and connect them together for direct action without reduction of speed. To accomplish this, the drivers may have separate short axles and the armature-shaft be in line between them. Two drums will be used, one for each driver, and each drum will have two oppositely-acting springs. The drums may be carried by the driving-axles or by the armature-shaft. By another form the armature-shaft is sleeved upon the driving-axle, which connects the driving-wheels rigidly, as usual, one or two spring-drums being used to connect the armature-shaft and driving-axle together. The invention, however, in its principal features, is applicable to arrangements wherein speed-reducing gearing of any character is introduced between the motor and the drivers.

In stationary motors, where motion in one direction alone is desirable, the construction could be simplified by the use of one spring and the omission of the clutching device releasing in one direction. This construction might also be used where motion in opposite directions is given the driven apparatus, whether a stationary or moving machine, by maintaining the motion of the motor in one direction and reversing that of the driven apparatus by an intermediate mechanical device of any well-known construction.

In the accompanying drawings, forming a part hereof, Figure 1 is an elevation and partial vertical section of an electric locomotive frame and drivers on separate short axles with my invention applied thereto; Fig. 2, a diametrical section of a drum on line 2 2, in Fig. 3, showing spring in elevation; Fig. 3, a section through a drum on line of axis, one spring only being in section; Fig. 4, an elevation and partial vertical section showing the armature sleeved on the driving-axle; Fig. 5, a section of a drum with the adjustable shoe, and Fig. 6 a view of a further modification.

A A' are the drivers of an electric railway-locomotive, which may be designed for drawing other cars, or may be a car for passengers or freight provided with power for propelling itself, and, if desired, for drawing one or more other cars.

B is the armature of the electric motor mounted on shaft C, and D is the field-magnet of the motor.

As shown in Fig. 1, the drivers are mounted on separate short axles $a$ $a'$, the armature-shaft C being in line between them. Such axles and shaft are connected and held in line by a common frame, E.

F F' are two drums, secured to the inner ends of driver-axles $a$ $a'$, and having the ends of the armature-shaft pass nearly through them. These drums are not secured to the armature-shaft, but are connected therewith by the spiral plate-springs G G' and H H'. Each drum contains two springs coiled in opposite directions, the springs G H acting when the motor turns in one direction, and G' H' when the motor turns in the opposite direction. The springs are held to the drums at their outer ends by friction, as already explained, where they may be provided with wearing-shoes capable of being replaced, as will be readily understood. At their inner ends they are connected with the armature-shaft by suitable clutch, cam, or ratchet devices which lock positively in one direction (that winding up the springs) and release in the other.

For purposes of illustration, I have shown the inner end of each spring secured to a collar surrounding the armature-shaft, each collar containing cam-slots and rollers, $b$ $b'$, which grip the shaft in one direction and roll freely over it in the other. The clutching-collars of springs G H act oppositely to the same parts of springs G' H', as shown by dotted lines in Fig. 2. The drums preferably have for each spring a friction-shoe, I, Fig. 5, projecting beyond friction-surface of drum. This may be pivoted to drum at one end, as shown at $c$, and be adjusted at the other end by a screw, $d$. The drivers may be connected rigidly by a driving-axle, K, in which case the armature may be sleeved upon this driving-axle, as shown in Fig. 4. In this figure the drums are shown as secured to the armature-shaft; but it is immaterial whether this or the reverse construction is employed. It is evident that where the motor turns in one direction only, as will usually be the case with stationary motors, one or more springs, acting in one direction, may be employed, and the clutching devices formed by the loose collars with slots $b$ and the rollers $b'$ can be dispensed with. In Fig. 6 such a construction is shown. The shaft L and drum M are connected one with the motor and the other with the driven machine. The spring N is fixed at its inner end to the shaft, while it is held by friction at its outer end.

What I claim is—

1. The combination, with an electric motor and the driven machine, of a double-acting spring mechanism intermediate between the motor and said machine, and gradually applying the power of the motor when revolved in either direction to such machine, substantially as set forth.

2. The combination, with an electric motor, of a mechanism intermediate between it and the driven machine automatically applying the power of the motor to such machine by impulses, substantially as set forth.

3. The combination, with an electric motor and the machine driven thereby, of an intermediate mechanism permitting the motor to turn independent of the said machine when the safe maximum power of the motor is reached, such mechanism being constructed to retard or momentarily stop such independent movement at intervals and to permit an acceleration of the motor speed at other times, substantially as set forth.

4. The combination, with an electric motor and the machine driven thereby, of an intermediate coiled spring held frictionally at one end, substantially as set forth.

5. The combination, with an electric motor and the machine driven thereby, of an intermediate coiled spring connecting the driving and driven parts, said spring being held frictionally at its outer end to one part, and a clutch, cam, or ratchet acting in one direction and connecting the inner end of the spring to the other part, substantially as set forth.

6. The combination, with an electric motor and the machine driven thereby, of an intermediate coiled spring held frictionally at one end and an adjustment for varying such friction, substantially as set forth.

7. The combination, with an electric motor and the machine driven thereby, of an intermediate coiled spring connecting the driving and driven parts and held frictionally to one part, and an uneven friction-surface upon which the free end of the spring bears for producing a retardation and acceleration of the movement, substantially as set forth.

8. The combination, with an electric motor and the machine driven thereby, of an intermediate coiled spring, an inclosing-drum upon which the outer end of the spring bears frictionally, and an adjustable shoe carried by said drum and projecting beyond the friction-surface of the drum, substantially as set forth.

9. The combination, with an electric motor and the machine driven thereby, of intermediate oppositely-acting coiled springs and oppositely-arranged clutches, cams, or ratchets, each releasing in one direction and locking in the other direction and bringing the springs into action for opposite movements of the motor, substantially as set forth.

10. The combination, with an electric motor and the machine driven thereby, of an intermediate spring mechanism connecting the motor and said machine directly without reduction of speed and serving to gradually apply the power of the motor to such machine, substantially as set forth.

11. The combination, with an electric motor and the machine driven thereby, of a double-acting spring mechanism connecting the motor and said machine directly without reduction of speed and gradually applying the power of the motor when revolved in either direction to such machine, substantially as set forth.

This specification signed and witnessed this 3d day of February, 1885.

EDWARD H. JOHNSON.

Witnesses:
ALFRED W. KIDDLE,
E. C. ROWLAND.